United States Patent [19]
Murray

[11] Patent Number: 4,536,116
[45] Date of Patent: Aug. 20, 1985

[54] COMPOSITE MOLDED PLASTIC ARTICLE

[75] Inventor: Pierre C. Murray, Buffalo Groove, Ill.

[73] Assignee: MacLean-Fogg Company, Mundelein, Ill.

[21] Appl. No.: 549,173

[22] Filed: Nov. 7, 1983

[51] Int. Cl.³ .......................... F16B 37/00; F16B 37/14
[52] U.S. Cl. ..................................... 411/82; 411/427; 411/432; 411/907; 16/121; 264/274
[58] Field of Search ................ 411/82, 176, 177, 180, 411/181, 427, 432, 902, 903; 264/274; 16/121, DIG. 30

[56] References Cited

U.S. PATENT DOCUMENTS

| | | | |
|---|---|---|---|
| 134,649 | 1/1873 | Decker | 411/427 |
| 1,045,562 | 11/1912 | Kennedy | 411/82 X |
| 2,105,704 | 1/1938 | Shippy et al. | 16/121 X |
| 2,250,580 | 7/1941 | Gregory | 411/82 X |
| 2,455,664 | 12/1948 | Ferguson et al. | 411/82 X |
| 3,187,796 | 6/1965 | Double | 411/181 X |
| 3,348,596 | 10/1967 | Leitner | 411/180 |
| 3,445,559 | 5/1969 | Siteman | 411/82 X |
| 3,742,995 | 7/1973 | Confer et al. | 264/274 X |
| 3,884,006 | 5/1975 | Dietlein | 411/82 X |
| 4,051,591 | 10/1977 | Thompson | 264/274 |
| 4,059,199 | 11/1977 | Quaney | 411/427 X |

FOREIGN PATENT DOCUMENTS

| | | | |
|---|---|---|---|
| 254145 | 6/1961 | Australia | 411/427 |
| 767903 | 8/1954 | Fed. Rep. of Germany | 411/177 |
| 2626178 | 12/1977 | Fed. Rep. of Germany | 411/176 |
| 2368630 | 6/1978 | France | 411/176 |
| 1147111 | 4/1969 | United Kingdom | 16/121 |
| 1274352 | 5/1972 | United Kingdom | 411/177 |

*Primary Examiner*—Thomas J. Holko
*Attorney, Agent, or Firm*—Mason, Kolehmainen, Rathburn & Wyss

[57] ABSTRACT

A composite molded plastic article includes a metal nut insert adapted to be molded in place within the body of plastic material. The nut insert is adapted to be mounted on a pin projecting into a mold cavity of the mold used in forming the article. The nut insert includes a central bore extending between a pair of parallel, planar faces of polygonal outline and defining along the edges thereof a first pair of substantially planar, opposite side edges which angularly intersect a second pair of opposite side edges having a longitudinally extending groove therein and/or a parallel rib between the parallel, planar faces of the nut insert.

11 Claims, 9 Drawing Figures

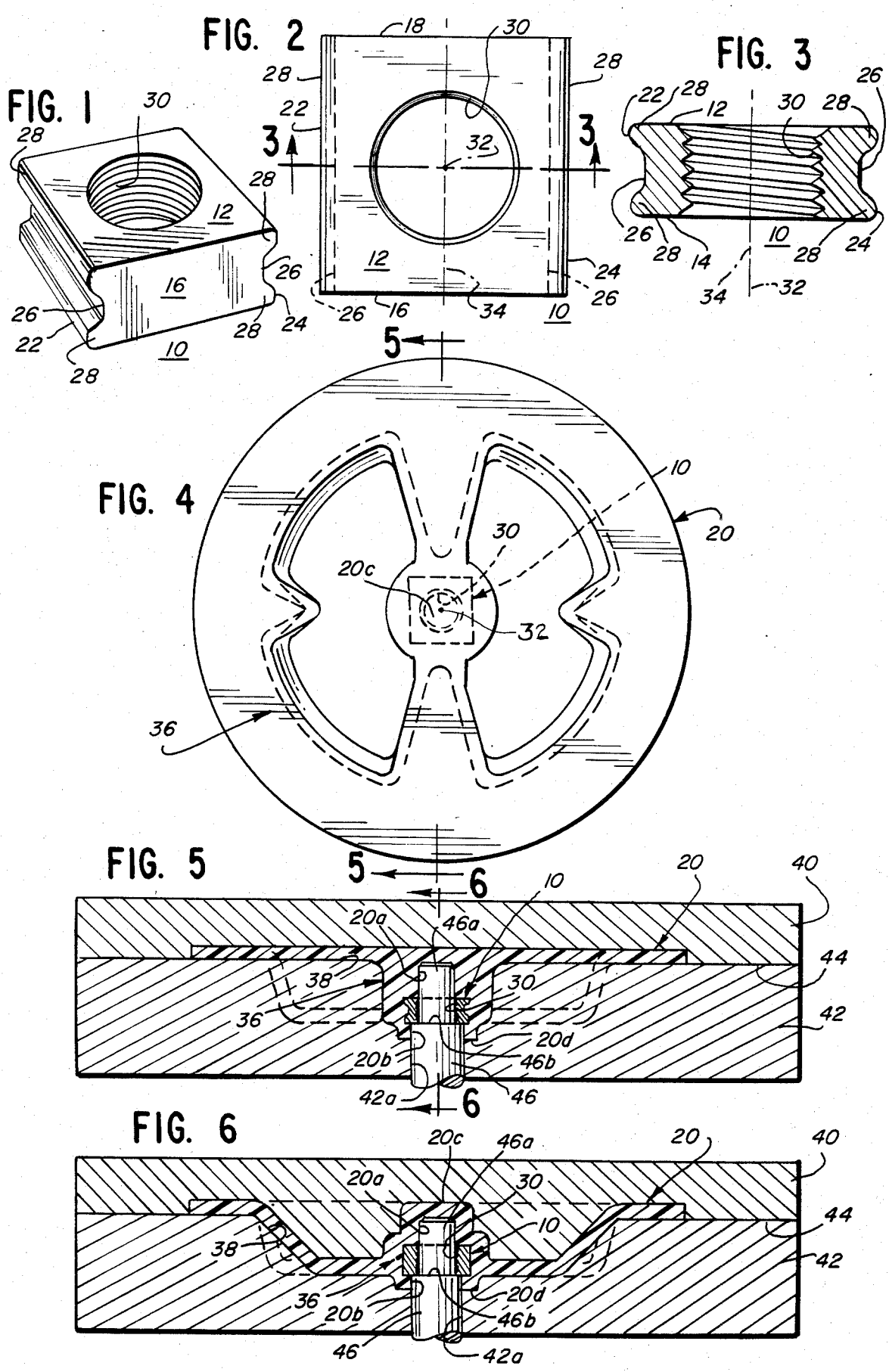

COMPOSITE MOLDED PLASTIC ARTICLE

BACKGROUND OF THE INVENTION

1. Field of the Invention

The present invention relates to a new and improved composite molded plastic article with a nut insert molded in place therein and more particularly relates to a composite molded plastic article wherein a nut insert having a threaded bore is adapted to be mounted on a pin extending into a mold cavity while a body of molded plastic material is formed around the nut insert.

2. Description of the Prior Art

Over the years, a wide variety of molded plastic articles have been provided with various types of fasteners and internally threaded inserts and the like, molded in place therein. Many different types of metal inserts having sophisticated shapes and complex outer surfaces have been developed and the following U.S. Patents have been issued relating to metal inserts, fasteners and molded plastic articles having threaded elements molded in place:

U.S. Pat. Nos. 2,359,031; 2,862,537; 3,016,578; 3,019,865; 3,085,613; 3,313,078; 3,339,609; 3,445,559; 3,485,282; 3,646,981; 3,742,995; 3,765,464; 3,809,139; 3,878,598; 3,884,006; 4,023,257; 4,051,591; 4,143,193; 4,226,550; 4,269,387; and 4,341,053.

In addition, a variety of threaded metal inserts and anchors are listed and illustrated in the 1982 addition of "Assembly Engineering Master Catalog" on pages 197-209 and in advertising pages therein illustrating "TAPTITE" products and "TORX" products made by the Camcar Division of Textron, Inc.

Many of the anchors and inserts of the prior art are relatively high in cost because of the rather exotic shapes and surfaces thereof. In addition, many inserts are difficult to utilize and are particularly hard to position and orient in a mold cavity in a molding operation. Many of the prior art anchors and inserts are subject to torsional failures and pullout failures because of overstressing or overtightening of a threaded element engaged therewith. Moreover, many of the existing metal insert systems do not provide a capability for handling an overdriven bolt or threaded member inserted therein and oftentimes overdriving a bolt causes permanent damage to the molded plastic material around the insert rendering the molded article useless. Many available inserts and anchor systems are costly to utilize because of the problem of positioning and orientating the insert within a mold in an automatic, rapid molding process.

OBJECTS OF THE INVENTION

It is an object of the present invention to provide a new and improved composite molded plastic article having a nut insert molded in place. More particularly, it is an object of the present invention to provide a new and improved nut insert which is low in cost, easy to position and orient within a mold cavity in a rapid, automatic molding process.

It is an object to provide a new and improved composite molded plastic article having a nut insert molded in place thereon which exhibits superior resistance to pull out and/or torsional stress.

Moreover, it is another object of the present invention to provide a new and improved, composite molded plastic article with a nut insert therein as described, wherein an overdriven bolt or threaded element is accomodated without resulting in damage to the plastic material of the molded article.

Yet another object of the present invention is to provide a new and improved, composite molded plastic article having a nut insert therein which provides excellent resistance against pull-out or push-out forces, and which minimizes the amount of cold flow in the plastic material around the insert when high stresses are involved.

Another object of the present invention is to provide a new and improved composite molded plastic article with a nut insert therein which is low in cost, relatively easy to manufacture and which provides superior characteristics in terms of resistance to mechanical failures and resistance to corrosion.

BRIEF SUMMARY OF THE INVENTION

The foregoing and other objects and advantages of the present invention are accomplished in an illustrated embodiment comprising a composite molded plastic article having a metal nut insert molded in place. The article includes a body of plastic material formed in a mold cavity having a pin projecting therein, on which the nut insert is supported during the molding operation. The metal insert has a central bore extending between opposite faces receiving a pin on which the nut is supported in the mold cavity while the body of the article is molded around exposed outside surfaces of the nut insert. The bore of the nut insert is normally a threaded bore and extends between a pair of spaced, opposite, parallel planar faces having a polygonal outline defining a first pair of opposite side edges normal to the planar faces and a second pair of opposite side edges normal thereto. The first pair of side edges are generally flat or planar and the second pair of side edges are formed with a longitudinally extending groove and/or a parallel, outwardly projecting rib between the parallel planar faces of the nut insert.

In one embodiment, a composite molded article is provided with a plastic insert forming a recess adjacent the axial bore of the nut insert for accommodating an overdriven threaded element such as a bolt or threaded stud engaged in the bore of the metal nut insert.

BRIEF DESCRIPTION OF THE DRAWING

For better understanding of the present invention reference should be had to the following detailed description taken in conjunction with the drawing, in which:

FIG. 1 is a perspective view of a new and improved, metal nut insert for molded plastic articles constructed in accordance with the features of the present invention;

FIG. 2 is an elevational view of one of the parallel planar faces of the nut insert;

FIG. 3 is a transverse cross sectional view taken substantially along line 3—3 of FIG. 2;

FIG. 4 is a top plan view of a new and improved composite molded plastic article having a nut insert therein constructed in accordance with the features of the present invention;

FIG. 5 is a transverse cross sectional view taken substantially along lines 5—5 of FIG. 4 and including elements of the mold utilized for making the article;

FIG. 6 is a cross sectional view taken substantially along lines 6—6 of FIG. 5;

DESCRIPTION OF PREFERRED EMBODIMENTS OF THE INVENTION

Figure 7:
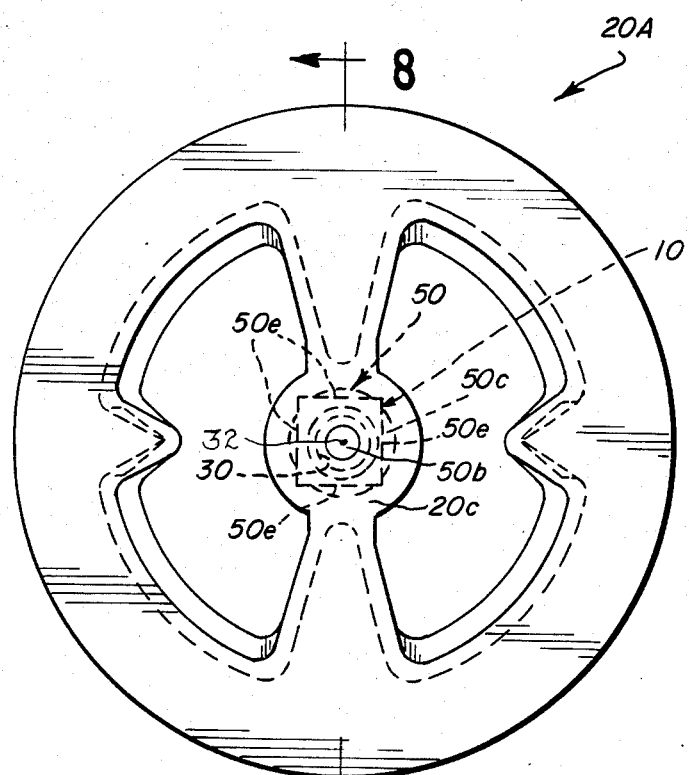
FIG. 7 is a top plan view of another embodiment of a composite molded plastic article having a nut insert therein in accordance with the features of the present invention.

Referring now more particularly to the drawings, in FIGS. 1, 2 and 3 is illustrated a new and improved nut insert 10 constructed in accordance with the features of the present invention. The metal nut insert 10 is especially adapted for use in a composite molded plastic article 20 such as a retainer for holding a spare tire in place in an automobile. The nut insert 10 comprises a relatively low cost, roll-formed nut manufactured in a roll forming process wherein a continuous wire of round or rectangular transverse cross-section is subjected to successive rolling operations by rolling dies to form a transverse cross section as shown in FIG. 3. After the material is rollformed into the desired polygonal cross-sectional shape, the individual nut inserts are formed by cutting off short lengths from the continuous strip and a central bore is formed to extend between opposite faces of the nut in an automatic, punching operation when a smooth bore is required or an automatic drilling and tapping operation when a threaded bore is provided.

In accordance with the present invention, each metal nut insert 10 includes a pair of opposite, parallel planar faces 12 and 14 of polygonal shape such as a rectangular/square outline. A first pair of flat opposite, parallel, side edges 16 and 18 extend between and normal or perpendicular to the planar faces 12 and 14, and a second pair of opposite, parallel side edges 22 and 24 normal to said planar faces angularly intersect the side edges of said first pair. Each of the second pair of side edges 22 and 24 is formed with a central groove 26 flanked on opposite sides by a pair of outwardly projecting ridges or ribs 28 which are rounded along opposite longitudinal edges to smoothly join the adjacent parallel planar faces 12 and 14 of the nut insert and the adjacent surface of the central groove 26 along inside opposite edges thereof.

The nut insert 10 is formed with a central bore or aperture 30 which is centrally disposed on the planar faces 12 and 14 and extends transversely therebetween along a central axis 32 (FIG. 3). A central bisecting plane 34 (FIG. 2) divides the nut insert into identical halves on either side and a dividing plane normal thereto along the section line 3—3 in FIG. 2 divides the nut insert into identical halves on either side. Usually the bore 30 is threaded internally for receiving a threaded bolt, stud or rod but the bore may also be smooth for a press fit onto rod elements when reguided in a particular application.

In accordance with the present invention and as best shown in FIGS. 5, 6, 8 and 9, the molded plastic article 20 is formed in an injection molding process and includes a body 36 formed to the shape of a mold cavity 38 provided in a cope element 40 and drag element 42, which elements are adapted to meet one another along a parting line or plane 44 when the mold is closed. The drag 42 of the mold is provided with a central aperture 42a in communication with the cavity 38 and a pin 46 is extendable into the aperture and projects into the mold cavity to support a nut insert 10 mounted thereon during the molding process.

The support pin 46 includes a cylindrical outer end portion 46a of reduced diameter which is sized to extend through the threaded bore or central passage 30 of a nut insert 10 mounted thereon. The outer end portion 46a of the pin is joined to the main body of the pin at a radial shoulder or stop 46b. The stop surface provides an abutment to engage either of the opposite planar faces 12 or 14 of the nut insert 10 when a nut is mounted in place on the pin ready for molding. As illustrated in FIGS. 5 and 6, the external outer end portion of the pin 46a projects beyond the outer face 12 or 14 of the nut insert placed thereon to form a recess or cavity 20a in the body 36 that is axially aligned with the bore 30 of the nut insert 10 and spaced inwardly thereof. The recess 20a in the finished molded plastic article 20 is provided in order to accommodate an overdriven bolt or threaded element that is extended into the nut insert 10 from the opposite side of the finished article 20.

Because the diameter of the end of the mounting pin 46a is slightly less than the minimum diameter of the threaded bore 30 in the nut insert, the hollow recess 20a that is formed in the article provides a lock nut function when a metal stud or bolt is overdriven and the threads thereof engage the walls of the recess which are formed of molded plastic material that is deformable.

The main body portion of the pin 46 forms a second, outer recess 20b of larger diameter than the opposite inner recess 20a and the outer recess exposes a portion of the adjacent planar face 12 or 14 of the nut insert after the molded article 20 is completed and with-drawn from the mold cavity 38. The diameter of the main body portion of the pin 46 is somewhat greater than the maximum diameter of the internal bore 30 of the nut insert 10 but is less than the dimension between pairs of opposite side edges 16 and 18 or 22 and 24. The finished molded plastic article 20 also includes outer surface portions 20c and 20d which are parallel of and outwardly spaced from the opposite planar faces 12 and 14 of the nut insert 10 molded within the body 36 of the molded plastic article. If desired for a particular application, a planar face 12 or 14 of the nut insert may be flush or even with an adjacent surrounding surface of the finished article 20 or may be spaced outwardly thereof.

In manufacturing the article 20 in a rapid and automatic system, the mold is opened and the pin 46 is inserted upwardly through the aperture 42a until the shoulder 46b reaches an appropriate level as shown. A nut insert 10 is then mounted on the small diameter outer end portion 46a of the pin and is moved downwardly until either face 12 or 14 engages the shoulder or stop surface 46b. Because of the symmetry of the nut insert 10 between its opposite faces 12 and 14, it does not matter which of the faces 12 or 14 is moved into contact with the supporting stop surface 46b on the mold pin 46. In addition, the rotational orientation of the nut insert 10 is generally not a factor because the planar faces 12 and 14 are of polygonal shape such as a square or rectangle in outline, and the grooved side edges 22 and 24 may be arranged in almost any angular relation with respect to the central body 36 of the molded plastic article 20. In the event a particular angular orientation is desired or required for any reason, the grooved opposite side edges 22 and 24 provide a means for mechanically grasping the nut inserts and for distinguishing between the first and second sets of opposite side edges thereof. The grooves 26 facilitate the pick up and orientation of nut inserts and aid in positioning of the nut inserts in a selected angular relationship on the stem 46a of the support pin 46 projecting into the mold cavity 38.

After a nut insert is mounted in place on the pin 46, the cope 40 is closed onto the drag 42 until the matching faces are in tight contact along the parting line or plane 44. The molded plastic material used in forming the body 36 of the article is then injected into the mold. The injected molten plastic material flows in to fill the grooves 26 and around the adjacent rib surfaces. After curing, the mold is opened and the article 20 is ejected from the mold cavity 38 with the metal nut insert 10 firmly embedded within the body of plastic material. The plastic material of the molded article 20 and the grooved and/or ribbed side edges of the nut insert 10 form a positive key-like interlock of great strength which provides excellent resistance against axial pull-out or push-in forces exerted on the nut insert. Moreover, the side edges and polygonal shape of the embedded nut insert provide excellent characteristics for resisting torsional forces tending to rotate or turn the embedded nut insert relative to the body of the molded article.

The square shape of the parallel planar faces 12 and 14 provide for maximum resistance against torsional forces which may be encountered when a threaded bolt or stud is inserted into the bore 30 of the nut insert in the finished article 20. The groove 26 and/or the ribs 28 on the opposite side edges 22 and 24 provide excellent resistance against axial forces tending to push-in or pull-out the nut insert in one direction or the other axially of the bore. The nut inserts may be formed of material such as aluminum or stainless steel in order to aid in resisting corrosion and these materials in combination with the resinous molded plastic material used for the body of the article 20 provide for a long and useful life.

Figure 8:
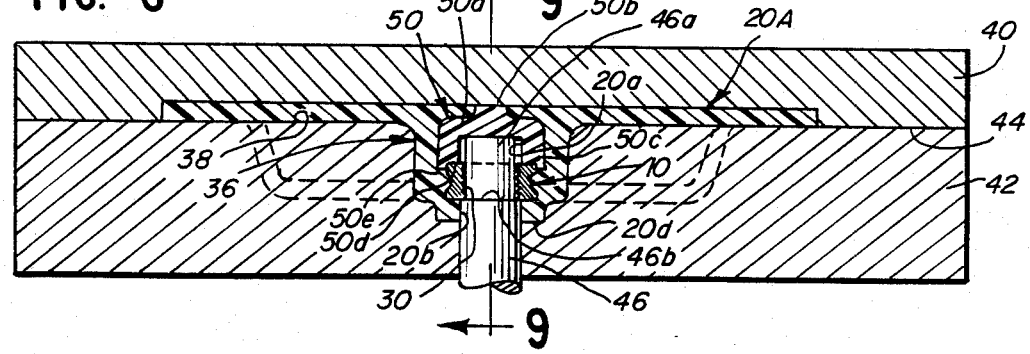
FIG. 8 is a cross sectional view taken substantially along lines 8—8 of FIG. 7 and additionally including elements of a mold utilized in making the article.
Figure 9:
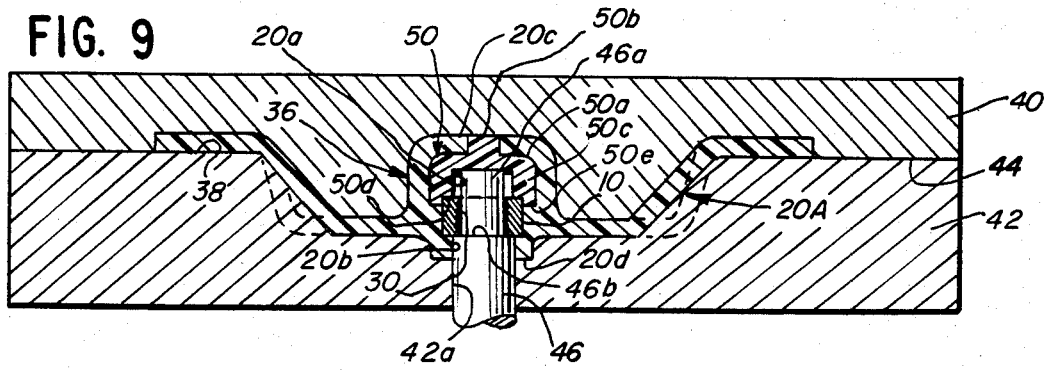
FIG. 9 is a transverse cross sectional view taken substantially along lines 9—9 of FIG. 8.

Referring now particularly to FIGS. 7–9, therein is illustrated another embodiment of a molded plastic article 20A which is especially designed to accommodate an overdriven threaded bolt or stud but with-out providing a lock nut function and without causing stress on the plastic when the threads of a stud or bolt project inwardly beyond the innermost face 12 or 14 of the the nut insert. For this purpose, a cup-shaped insert 50 formed of plastic material is provided and the plastic insert includes a circular end wall 50a having an outwardly projecting button 50b with an outer surface aligned with the adjacent outer surface 20c of the body 36 of finished article 20 so as to indicate visually that the article has a built in provision for accomodating an overdriven stud or bolt.

The plastic insert 50 has an annular side wall 50c with an inside diameter somewhat greater than the maximum diameter of the threaded bore 30 of the nut insert 10 but less than the distance between either pair of opposite first or second side edges 16 and 18, or 22 and 24. At the outer end, the sidewall 50c of the cup-shaped insert 50 is formed with radial shoulder surfaces 50d adapted to engage and contact an adjacent face 12 or 14 of a nut insert 10, and these radial shoulder surfaces cooperate with a plurality of outwardly projecting nut holding lips 50e having arcuate outer surfaces and flat inner surfaces adapted to engage and secure the opposite side edges 16 and 18, and 22 and 24 of a nut insert as best shown in FIG. 7. The interengaging surfaces of the metal nut insert 10 and the cup shaped plastic insert 50 provide for precision alignment of both inserted members in the body 36 of the molded plastic article 20, and when the molded article is hardened or cured and the pin 46 is withdrawn after the mold has been opened, the finished article is provided with an enlarged internal recess 20a aligned with the axis 32 of the nut insert adjacent an inner face 12 or 14. This recess 20a has a diameter greater than the maximum diameter of the bore 30 so that an overdriven bolt or stud will not engage and damage the molded plastic material forming the body 36 of the finished article 20. The circular button 50b of the insert is clearly visible on the finished product as shown in FIG. 7 and provides an indication that the composite molded plastic article 20 has an internal recess for accomodating an overdriven bolt or stud.

The pre-formed cup-shaped plastic insert 50 may be formed of high density polypropylene material or other resinous plastic materials and the body 36 of the composite molded plastic article 20 may likewise be formed of high density polypropylene, polycarbonate resin, polyethylene etc as required or desired. The nut inserts 10 may be formed of a wide variety of metals as needed for appropriate strength and corrosion resistance characteristics. While a particular type of molded plastic article 20 is herein illustrated and described, it is to be understood that the present invention is useful for an infinitely wide variety of composite molded plastic articles having nut inserts therein such as fuel and water tanks, crank levers, knobs, brackets of all types, etc.

Although the present invention has been described with reference to several illustrated embodiments thereof, it should be understood that numerous other modifications and embodiments can be made by those skilled in the art that will fall within the spirit and scope of the principles of this invention.

What is claimed as new and is desired to be secured by Letters Patent is:

1. A composite molded plastic article with a metal nut insert molded in place, comprising:

a body of molded plastic material, adapted to be formed in a mold having a pin projecting into a mold cavity used for making said article; and a nut insert having a central threaded bore adapted to be mounted on said pin within said cavity while said body is molded around surfaces thereof, said bore extending between a pair of opposite, parallel planar faces having a polygonal outline and including a first pair of opposite side edges normal to said planar faces comprising substantially planar surfaces, and a second pair of opposite side edges normal to said faces and angularly intersecting said first pair of edges said second side edges having a longitudinally extending, groove receiving said molded plastic material and positioned between planar faces, recess means in said body aligned axially of said threaded bore of said nut insert adjacent a planar face thereof spaced inwardly of an outer surface of said body for accommodating an overdriven threaded element engaged in said bore of said nut insert, said recess means comprising a nut holding insert molded in place in said body and having means for engaging and holding said nut insert in place in said mold cavity, said nut holding insert comprising a cup shaped member made of plastic material and said holding means thereof including wall portions engaging said opposite side edges of said nut insert, said cup shaped member further including an end wall and a stop wall spaced parallel thereof and adjacent said wall portions for engaging said adjacent planar face of said nut insert, said cup shaped member having a circular transverse cross-section with an inner diameter greater than that of said threaded bore of said nut insert, said end wall of said cup shaped member being spaced inwardly of an adjacent outside surface of said body of said article, and said end wall of said cup shaped member including a central spacer having an outer surface aligned with said outside surface of said body of said article.

2. The composite molded plastic article of claim 1 wherein said second side edges are formed with a longitudinally extending rib projecting outwardly of said groove.

3. The composite molded plastic article of claim 2 wherein said rib is rounded along an inner edge joining said groove.

4. The composite molded plastic article of claim 1 wherein said planar faces are square/rectangular in shape.

5. The composite molded plastic article of claim 1 including second recess means in said body aligned axially of said threaded bore of said nut insert adjacent an opposite planar face thereof spaced inwardly of an outer surface of said body for providing access to said threaded bore for a threaded element inserted from the exterior of said article.

6. The composite molded plastic article of claim 1 wherein said inner diameter of said cup-shaped member is less than the distance between opposite side edges of said nut insert.

7. The composite molded article of claim 5 wherein said second recess means is cylindrical with a diameter greater than that of said threaded bore of said nut insert.

8. The composite molded article of claim 7 wherein said diameter of said second recess means is less than the distance between opposite side edges of said nut insert exposing a portion of said opposite planar face of said nut insert.

9. The composite molded article of claim 1 wherein said body is symmetrical with respect to a central plane extending longitudinally along a central axis of said threaded bore of said nut insert.

10. The composite molded article of claim 2 wherein said rib is rounded along an outer edge joining one of said planar faces.

11. The composite molded article of claim 2 wherein each of said second side edges includes a pair of said ribs along opposite sides of said groove.

* * * * *